United States Patent
Tullsson

(10) Patent No.: US 7,236,125 B2
(45) Date of Patent: Jun. 26, 2007

(54) METHOD FOR REDUCING ANGULAR BLUR IN RADAR PICTURES

(75) Inventor: Bert-Eric Tullsson, Järfalla (SE)

(73) Assignee: SAAB AB (SE)

( * ) Notice: Subject to any disclaimer, the term of this patent is extended or adjusted under 35 U.S.C. 154(b) by 0 days.

(21) Appl. No.: 11/041,244

(22) Filed: Jan. 25, 2005

(65) Prior Publication Data

US 2006/0066475 A1    Mar. 30, 2006

(51) Int. Cl.
*G01S 13/89* (2006.01)
*G01S 7/40* (2006.01)
*G01S 13/90* (2006.01)
*G01S 13/44* (2006.01)

(52) U.S. Cl. .................. 342/173; 342/25 R; 342/25 A; 342/25 F; 342/89; 342/94; 342/147; 342/149; 342/159; 342/165; 342/175; 342/176; 342/179; 342/195

(58) Field of Classification Search .... 342/25 R–25 F, 342/89, 94–97, 118, 128–147, 159–176, 179, 342/189–197, 149–154
See application file for complete search history.

(56) References Cited

U.S. PATENT DOCUMENTS

| | | | |
|---|---|---|---|
| 3,710,384 A | | 1/1973 | Ashcraft |
| 4,717,916 A | * | 1/1988 | Adams et al. ............... 342/179 |
| 5,184,133 A | * | 2/1993 | Tsao ......................... 342/25 F |
| H1181 H | * | 5/1993 | Rihaczek .................. 342/25 F |
| 5,243,351 A | * | 9/1993 | Rafanelli et al. ........... 342/179 |
| 5,610,610 A | * | 3/1997 | Hudson et al. ............ 342/25 F |
| 5,644,508 A | * | 7/1997 | McNary et al. ............ 342/159 |
| H1720 H | * | 4/1998 | Chen ......................... 342/25 E |
| 5,831,570 A | | 11/1998 | Ammar et al. |
| 6,155,704 A | * | 12/2000 | Hunt et al. ................ 342/25 F |
| 6,192,322 B1 | * | 2/2001 | Rafanelli et al. ........... 342/196 |
| 6,201,496 B1 | | 3/2001 | Lee |
| 6,356,227 B1 | * | 3/2002 | Gibson et al. ............. 342/25 D |
| 6,661,369 B1 | * | 12/2003 | Cho .......................... 342/25 R |
| 2003/0222807 A1 | * | 12/2003 | Cho ........................... 342/196 |

FOREIGN PATENT DOCUMENTS

EP    0 899 582 A2    3/1999

OTHER PUBLICATIONS

International Search Report No. EP 04 44 5004, dated Jun. 28, 2004, 3 pages.
Synthetic Aperture Radar (SAR, [LHMN Ch. 15]), "Doppler Beam Sharpening, With Rotating Antenna", [LHMN P. 260].
Sherman, Monopulse Principles and Techniques, ISBN 0-89006-137-8, Artech House 1984.
[LHMN] Lacomme/Hardange/Marchais/Normant, Air and Spaceborne Radar Systems, ISBN 1-891121-13-8, SciTech Publishing 2001.

* cited by examiner

*Primary Examiner*—Bernarr E. Gregory
(74) *Attorney, Agent, or Firm*—Connolly Bove Lodge & Hutz, LLP

(57) ABSTRACT

A method for reducing angular blur in radar pictures achieved in range bin based detection systems includes measuring a variable S(x, y) such as amplitude or power as a function of an angle x and a distance y. An expression:

corrected angular position=angular position+angle correction is determined in each range bin for a plurality of angular values x. The term "angle correction" includes derivative(s) of first or higher order of the variable S(x). The variable measured at the angular position "angular position" is moved to the variable in the angular position "corrected angular position", and the moved variable and the variable in "corrected angular position" are processed by adding or maximizing the values.

7 Claims, 3 Drawing Sheets

METHOD FOR REDUCING ANGULAR BLUR IN RADAR PICTURES

BACKGROUND

The present invention refers to a method for reducing angular blur in radar pictures.

A radar works by radiating electromagnetic waves from an antenna, and detecting the reflected waves (the echoes) from objects close to the radar. Very often, the radar can distinguish echoes from objects at different distances and thus has a range resolution. Often, the range measurement is discrete, in the sense that the measured range values are not continuously variable, but rather take one of a predetermined set of values, very often equidistant. The following discussion is limited to such radars, with a discrete-valued range measurement (range bins).

To survey a large area, many search radars have a scanning antenna, very often rotating to cover all directions, or going back and forth to cover a sector, say in azimuth. In this case, the radar receives in each angular position echoes from all studied range bins (in some range bins, there may be no echo). If the radar is pulsed, the detection is made only in discrete angular positions, one for each pulse.

In this case, the received amplitude (or power) of the radar echoes can be illustrated as a radar picture with a finite set of radar picture elements (pixels). In most cases, the radar picture of a cartesian sector is presented as a rectangle in polar coordinates, with a finite number of angular positions along the horizontal axis and a finite number of range bins along the vertical axis (this is called a "B scope" presentation). For convenience, very often the logarithm of the amplitudes (powers) are presented (deciBel scale, dB).

The following discussion is limited to radar with data presented as such rectangular B scope pictures with a finite number of pixels. The angular coordinate is generally thought of as azimuth, radar antenna scanning about a vertical axis, but elevation is also possible.

The radar sensitivity is greatest in a direction determined by the antenna. In most cases, this direction is in front of the antenna. Since the physical antenna width is a limited number of wavelengths corresponding to the frequency used, the antenna main beam, where the sensitivity is greatest, is not infinitely narrow, but has a certain angular width. The radar receives an echo from an object not only when the antenna is pointed directly towards the object, but also when the antenna is pointed slightly to the right of the object, when the object is illuminated by the left part of the antenna main beam, and when the antenna is pointed slightly to the left of the object, when the object is illuminated by the right part of the antenna main beam. A small (point-shaped) radar reflector thus gives echoes during the whole angular extent of the radar main beam.

Since there are—for redundancy, for Doppler analysis, or for other reasons—generally several angular positions used (several pulses transmitted) per radar antenna main beam width, the effect is to make radar pictures blurred in the angular coordinate. This blur makes analysis of the radar picture more difficult. It becomes non-trivial to determine the angle to a radar target, even if the target is point-shaped, and comparison between the radar picture and a picture of the same area by another sensor with different characteristics (maybe another radar) becomes difficult.

A number of methods exist for reducing angular blur and some major lines will be discussed below.

According to a first major line the methods are based upon deconvolution. Since the blur can be considered the result of convoluting a blur-free picture with the antenna beam, it can be eliminated in theory by making a Fourier transformation of the picture, in the angular direction, dividing with the Fourier transform of the antenna diagram, and then performing an inverse Fourier transformation. The rationale is that Fourier transformation converts convolution to multiplication.

According to a second major line methods within general radar are discussed. Frequently, data such as those in FIG. 1 showing a measured radar picture of a Cartesian sector in dB scale with angular positions along the horizontal axis and range bins along the vertical axis are passed through a "target extractor" which often works by defining a "target" as a local maximum with amplitude exceeding a suitably defined threshold. Then, in a given range bin, the angular position of the target is defined as the position where the maximum is attained. A more exact angular position can be computed by fitting a suitable curve, such as a parabola with angle position as the independent variable, to the data near the local maximum, and compute the angular position of the maximum of the parabola fitted. In particular, it is not difficult to fit a parabola to the three points closest to the local maximum, with the highest amplitudes, in particular if the angular positions are equidistant. To fit a parabola to more than three points, a least squares computation can be used.

This procedure generally works well for tracking of a limited number of targets, but is not always practicable for de-blurring a whole picture, for presentation or for other purposes.

According to a third major line a moving radar is used. For airborne radars, advanced methods as Synthetic Aperture Radar (SAR, [LHMN Ch. 15]), in its simplest form "Doppler Beam Sharpening" [LHMN p. 260], use a moving radar with a radar radial velocity (Doppler) measurement, and advanced signal processing, to get a very sharp "picture" of the surveyed part of the ground (not always described as a rectangle in polar coordinates). In this specification LHMN is used as a short reference to Lacomme/Hardange/Marchais/Normant, Air and Spaceborne Radar Systems. An Introduction, ISBN 1-891121-13-8, SciTech Publishing 2001.

According to a fourth major line methods for reduction of angular blur presuppose a particular type of radar antenna, as a monopulse antenna or an array antenna.

Tracking radars are radars which can measure how much the radar antenna direction (the boresight) differs from a desired direction (the difference is generally called the error angle). Tracking radars are used for aiming guns, guiding missiles, keeping an antenna tracked on a communications satellite, etc. Generally a tracking radar uses a monopulse antenna [Sherman]. In this specification Sherman is used as a short reference for Sherman, Monopulse Principles and Techniques, ISBN 0-89006-137-8, Artech House 1984. A monopulse antenna can use at least two antenna patterns, a sum pattern with its maximum directivity in the antenna direction, and a difference pattern which is sensitive for targets slightly off the antenna direction. There is one difference pattern for every angular variable used (azimuth, elevation). FIG. 3 shows typical sum and antenna patterns ([Sherman p. 138]). In FIG. 3 the quantities (field strengths) have both positive and negative signs. FIG. 4 shows the absolute value of the difference pattern, compared to the sum pattern.

Some radars—often airborne multi-function radars—use a monopulse tracking antenna when surveying and searching. Then, the difference channel can be used in various ways to reduce the picture blur due to the main (sum) antenna beamwidth. Two kinds of established methods are indicated below. Both may be covered by the name "Monopulse Beam Sharpening".

Let S and D indicate the sum and difference channel respectively. Then S−k·abs(D), with a suitable small positive constant k, is a pattern which is =S in the antenna direction (boresight), where D=0, but which is smaller than S off boresight, and thus narrower than S. Such a pattern can be used to reduce the angular blur in radar pictures. To avoid negative amplitude (power) values, a combination max(0, S−k·abs(D)) may be used.

A much better and more sophisticated method is to compute the monopulse error angle in every point in the picture and determine a corrected angular position as "angular position+error angle". The power detected in a range bin in a certain angular position is not stored in the original angular position, but rather in the corrected angular position [LHMN pp. 205-206]:

corrected angular position=angular position+error angle

This gives a very effective "beam sharpening" for display or for other purposes.

Generally, in the picture to be de-blurred, there are only a limited number of allowed angular positions (called "sub-beams" in [LHMN, p. 206]), and then the right hand side of the formula will have to be rounded to the nearest allowed position. The "storage" may be performed by addition to already stored values (especially when adding powers), or by using an operation of type max(new_value,already_ stored_values). An alternative, which in some cases gives more exact results, is to distribute the magnitude (power) on the two nearest allowed angular positions, maybe by linear interpolation.

If the radar uses an array antenna with several independent transmitting or receiving elements special methods are also available.

SUMMARY

This disclosure provides a general method for efficiently reducing angular blur and which is usable also for large amounts of data. The method of this disclosure does not use deconvolution and presupposes neither Doppler measurements nor a particular type of antenna.

BRIEF DESCRIPTION OF THE DRAWINGS

The invention will be described in more detail below with reference to the accompanying drawings in which.

DETAILED DESCRIPTION

In the following, a procedure for reducing the angular blur of radar pictures, of the type defined above, will be presented. In the discussion, the method will be supposed to be implemented by computations in a digital processor.

Figure 1:
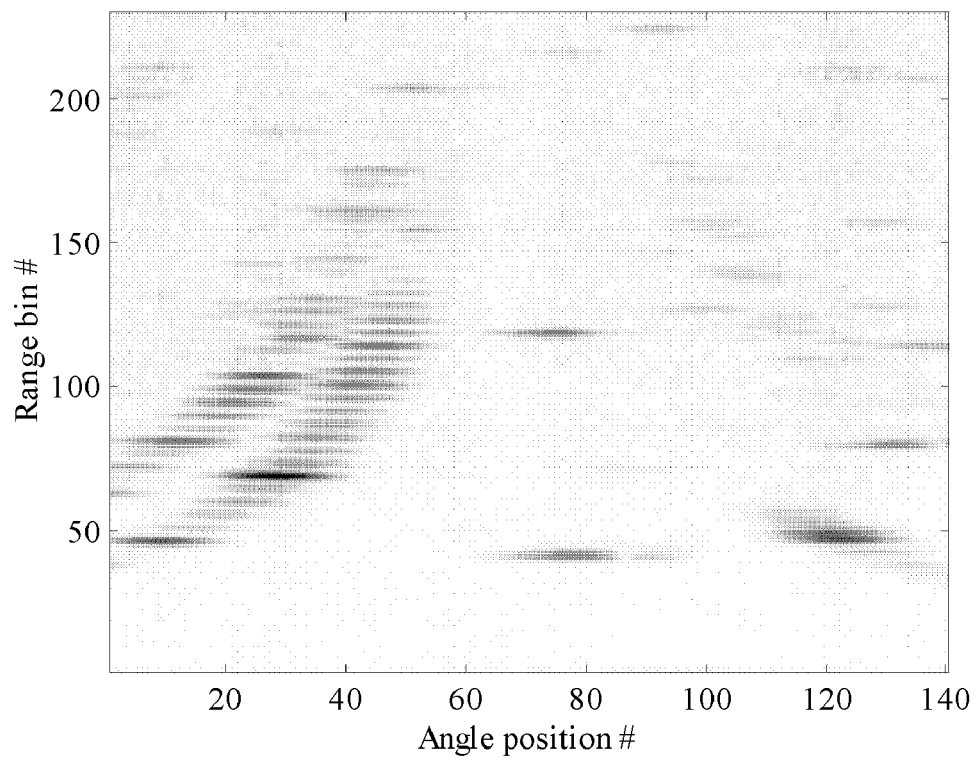
FIG. 1 shows a measured radar picture of a Cartesian sector in dB scale.

In FIG. 1, a typical measured radar picture of a Cartesian sector is presented. The picture shows the magnitude of the received radar (video) signal in 230 range bins (range values) for each of 140 angular positions. If the magnitude is denoted by S, the data thus can be described as an array S(i, j), 1<=i<=140, 1<=j<=230. Dark spots mean large magnitude. Both the range bins and the angular positions will here be considered equidistant.

It is obvious that FIG. 1 contains many distinct objects, but that the angular blur due to the radar (azimuth) beamwidth is very prominent. There seem to be no point-shaped targets; instead, all targets are drawn out in the angular direction. The radar used has an azimuth 3 dB beamwidth of about 10 angular positions, which means that a point target with a contrast to the background of 20 dB or more may appear to be about 20 angular positions wide.

Figure 2:
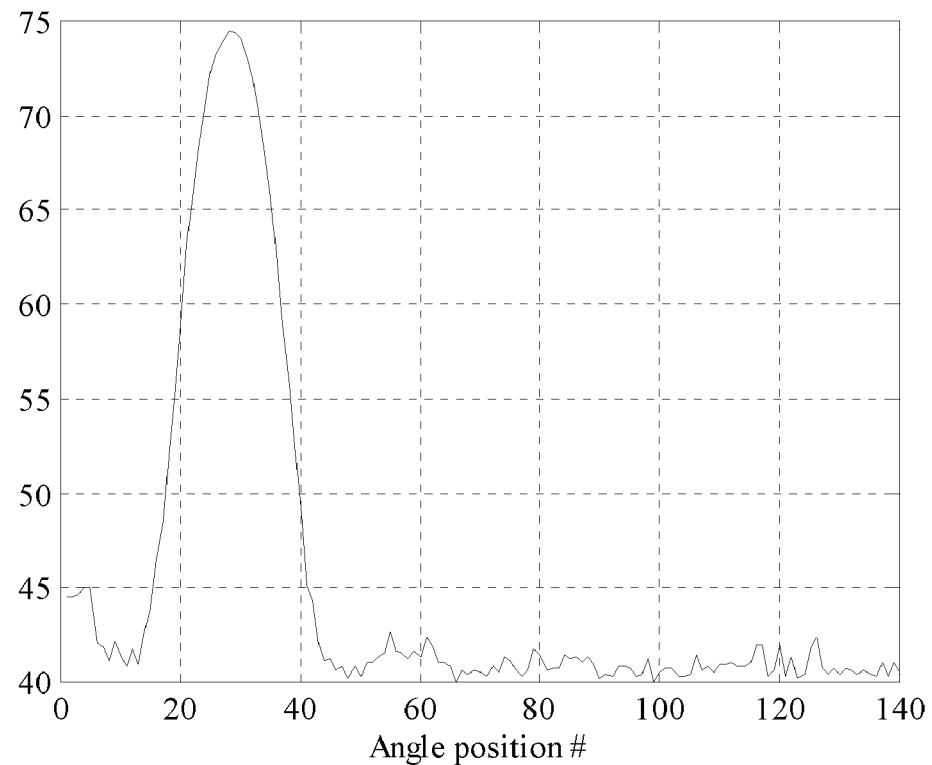
FIG. 2 shows a horizontal cut through FIG. 1 for range bin #69 in dB scale.

FIG. 2 shows a horizontal cut (constant range) through FIG. 1, through the range bin #69, which contains a very strong radar reflector (target). The data in FIG. 2 thus can be described as S(i, 69), 1<=i<=140. The main beam (the main lobe shape of the radar antenna directivity pattern) is clearly visible. Near a local maximum, the measured amplitudes follow the beam pattern.

In FIG. 2, the size of the radar antenna azimuth main beam gives noticeable target returns in angle positions at least between #20 and #40, although the target seems to be located roughly in angular position #28 or #29.

The shape in FIG. 2 is really the left-right mirror image of the antenna beam shape (to the left of the correct position, the right part of the antenna beam illuminates the target, etc.). However, most real antenna beams are approximately symmetrical, and then the difference between left and right is hardly discernible.

In the following, reduction of the angular blur will be illustrated on the data in FIGS. 1, 2.

Before a closer presentation of our suggested method for reducing angular blur in radar pictures is given, some differential equations discussions follows below as a background. Suppose that a measured variable S(x) like that in FIG. 2 has a local maximum at the angle $x=x_0$. Near the maximum, the curve can be approximated by the antenna beam pattern, also denoted by S(x), with a slight abuse of notation. S is generally a smooth function looking like a parabola, symmetric about $x=x_0$ and with horizontal tangent at its maximum at $x=x_0$.

The desired objective is to use the measured data to determine the nearest local maximum $x_0$ and concentrate the blurred energy of the beam in this point. $x_0$ can be determined by some kind of local curve fitting by locally fitting an expression for the beam shape function S to measured data, e.g. by least-square methods (as in the "target extractor" mentioned above).

However, $x_0$ can also be determined by use of a differential equation, using one or more (partial) derivatives (in the angular direction) of S(x), estimated from data. Since the first derivative gives the slope of S(x) and the second derivative gives the curvature, this is geometrically reasonable. Such a procedure is in many cases advantageous, and will now be demonstrated by some examples.

Ex. 1. A very simple approximation of the beamshape close to $x=x_0$ is a second-order polynomial:

$$S(x)=k \cdot (1-c \cdot (x-x_0)^2)$$

which gives a parabolic curve with a maximum=k at $x=x_0$. The constant k gives the amplitude at the maximum, and the constant c determines the shape: a large positive c gives a sharp, pointed beam. The approximation should only be used for small values of $(x-x_0)$, giving positive values of $S(x)$.

The (partial) derivative of S, as a function of the angular variable x, is given by $$S'(x)=-2 \cdot k \cdot c \cdot (x-x_0)$$

The nuisance variable k is eliminated by taking the quotient between S' and S:

$$q(x)=S'(x)/S(x)=-2 \cdot c \cdot (x-x_0)/(1-c \cdot (x-x_0)^2)$$

which gives the differential equation $$(1-c \cdot (x-x_0)^2) \cdot S'(x)+2 \cdot c \cdot (x-x_0) \cdot S(x)=0$$

For $x=x_0$, $2 \cdot c \cdot (x-x_0) \cdot S(x)=0$, but also $S'(x_0)=0$ (horizontal tangent).

If, for a certain angle x, S'(x) and S(x) can be computed or estimated from the radar data, q(x) is a known value. The relation for q(x) gives a second-order equation for the unknown $(x_0-x)$:

$$(x_0-x)^2+2/q \cdot (x_0-x)-1/c=0$$

with q(x) simply written q. Only one of the roots is of interest:

$$x_0-x=-1/q+\mathrm{sqrt}(1/q^2+1/c)=q/c/(\mathrm{sqrt}(1+q/c)+1)$$

(using the conjugate rule) and thus $$x_0=x+q/c/(\mathrm{sqrt}(1+q/c)+1)$$

which, for any value of the angle x near the maximum $x=x_0$, gives an estimate of $x_0$.

The algorithm is (note that c is a known parameter in the supposed beamshape):

In each range bin, for an angular value x, get S(x) from the measured data and estimate S'(x). Compute the ratio $q=S'(x)/S(x)$ and substitute this value in the right hand side of the last equation above. Then the right hand side evaluated numerically gives an estimate of the angle $x_0$, closest to x, where the beam has a maximum.

The algorithm is reasonable. If S is a magnitude or power, S(x) is always positive. If q(x) and thus the slope S'(x) is >0, then the nearest maximum $x_0$ should be >x. If q(x)<0, $x_0$ should be <x. Since the denominator $\mathrm{sqrt}(1+q/c)+1$ above always is >0, the algorithm is qualitatively as expected.

The algorithm is mainly of interest for small values of q(x) (near the maximum, S(x) is large and S'(x) is numerically small).

With x=angular position and $x_0$ interpreted as "corrected angular position", the formula used is of the type corrected angular position=angular position+angle correction The formula also gives an expression for the "angle correction" ("error angle").

End of Example 1.

Depending on the assumptions on the beamshape S(x), the formulae can be slightly different. This will now be illustrated.

Ex. 2. Another common beamshape approximation in the radar literature is $$S(x)=k \cdot \cos^2(d \cdot (x-x_0))=k/2 \ (1+\cos(2 \cdot d \cdot (x-x_0)))$$

Figure 3:
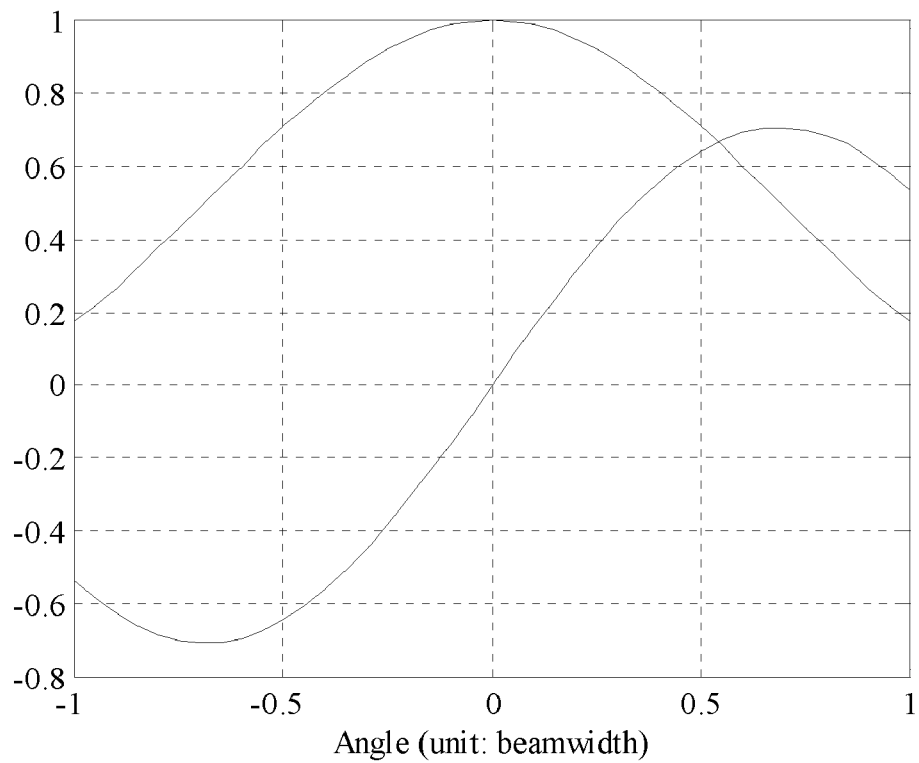
FIG. 3 shows a typical monopulse sum pattern (symmetric) and difference pattern.
Figure 4:
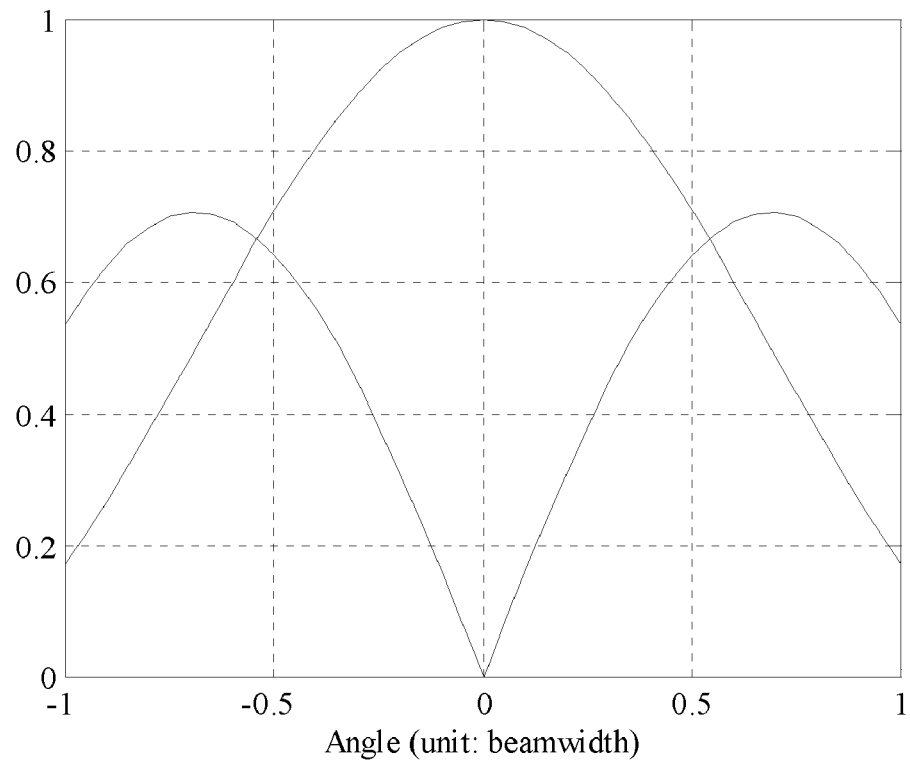
FIG. 4 shows a monopulse sum pattern and absolute value of difference pattern.

In fact, the approximation used in [Sherman, p. 138] for the sum lobe of FIG. 3 is of this type. As in Ex. 1, the constant k gives the amplitude of the maximum and the constant d determines the shape of the beam (narrow or wide maximum).

The derivative S'(x) is then given by $$S'(x)=-2 \cdot k \cdot d \cdot \cos(d \cdot (x-x_0)) \cdot \sin(d \cdot (x-x_0))$$

Eliminating the nuisance variable k by taking the quotient $q(x)=S'(x)/S(x)$ gives $$q(x)=S'(x)/S(x)=-2 \cdot d \cdot \tan(d \cdot (x-x_0))=2 \cdot d \cdot (x_0-x))$$

(giving the differential equation $S'(x)+2 \cdot d \cdot \tan(d \cdot (x-x_0)) \cdot S(x)=0$)

Solving for the unknown $x_0-x$ gives $$d \cdot (x_0-x)=\arctan(q(x)/2/d)$$

and finally $$x_0=x+1/d \cdot \arctan(q/(2 \cdot d))$$

which is the desired relation, a formula of the type corrected angular position=angular position+angle correction End of Example 2.

The common features of the examples are:

In each range bin, for every value of the angle x, the (partial) derivative S'(x) (and higher derivatives, S"(x) etc.), in the angular direction, is determined (estimated) from data. A formula of the type corrected angular position=angular position+angle correction is used, where the expression "angle correction" is computed by a formula using S(x), S'(x), . . . and known parameters of the beam shape. Very often only quotients of the type S'(x)/S(x) appear in the formula.

These features are used in the method for reducing angular blur which will now be described.

The method suggested does not presuppose a monopulse antenna, only an ordinary (search) antenna pattern. The measured amplitude (power) at angle x and range y is denoted by S(x, y). When the (fixed) value of the range is irrelevant, we simply write S(x). It is supposed that the angle x and the range y only occur as discrete (non-continuous) values. To enhance that, we may write the measured data as $S(i, j)$, $i_1<=i<=i_2$, $i_1<=j<=j_2$.

In every range bin, and for the angular position x, the formula of the preceding section is used:

corrected angular position=angular position+angle correction where the "angle correction" is given by a formula involving first or higher derivatives (partial derivatives in the angular direction) of S(x):

angle correction=function of S(x), S'(x), . . . and known parameters of the beam shape.

The formulae for "angle correction" can be slightly different depending on the approximation of the beam pattern used. The method suggested comprises this whole class of formulae. In particular, the method comprises the class of formulae using only ratios of the type S'(x)/S(x).

The method suggested can be realized in various ways. One advantageous realization uses the following method:

In every range bin, the (partial) derivatives dS/dx, S"(x) etc. are computed approximately, generally using finite differences in the angular direction. If the amplitude in the radar picture at angular position i and range bin j is called S(i, j), this means for the first derivative dS/dx (really a partial derivative, along the angular "i" direction), in range bin j:

$$dS/dx(i, j) = \frac{(\text{approximately})(S(i+1, j) - S(i-1, j))}{(\text{angular pos. } (i+1) - \text{angular pos. } (i-1))}$$

Here, a symmetric difference is used, but other possibilities exist and can be used in different realizations of the method. If the angular positions are approximately equidistant, the denominator is constant and the computations can be simplified.

Symbolically, this realization means that dS/dx is estimated by differences as $\Delta S/\Delta x$.

It is advantageous if the number of angular positions per beamwidth is not to small, as then some numerical smoothing (averaging, low-pass filtering) of the difference quotients $\Delta S/\Delta x$ etc. is possible, to get a better numerical estimate.

Also, it is advantageous to avoid using the formula when the denominator S is too small. One possibility is to use the correction formula only in the points where S is greater than a suitable threshold. Another possibility is to use the formula in all picture points, but to replace the denominator S with S+t, where t is a suitable (small) positive threshold.

Figure 5:
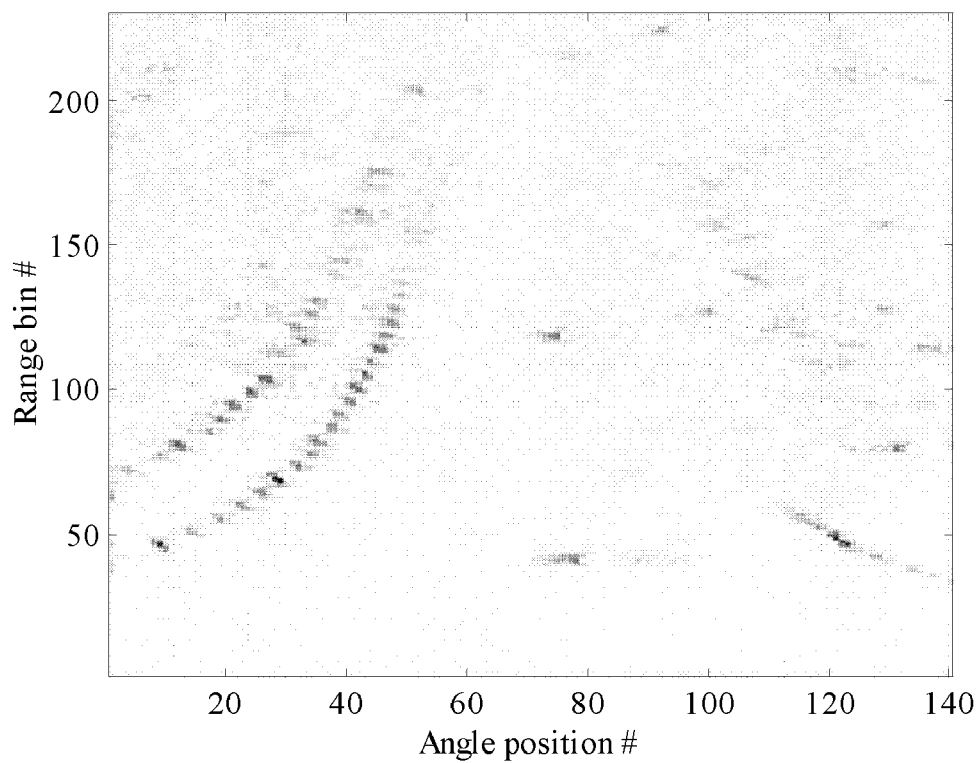
FIG. 5 shows a radar picture according to FIG. 1 after reduction of blur in accordance with our invented method.

FIG. 5 below shows FIG. 1 after a correction using one of the formulae covered by the method.

It is obvious from FIG. 5 that the correction method suggested "sharpens the antenna beam" and concentrates radar echoes around the correct angular positions.

Figure 6:
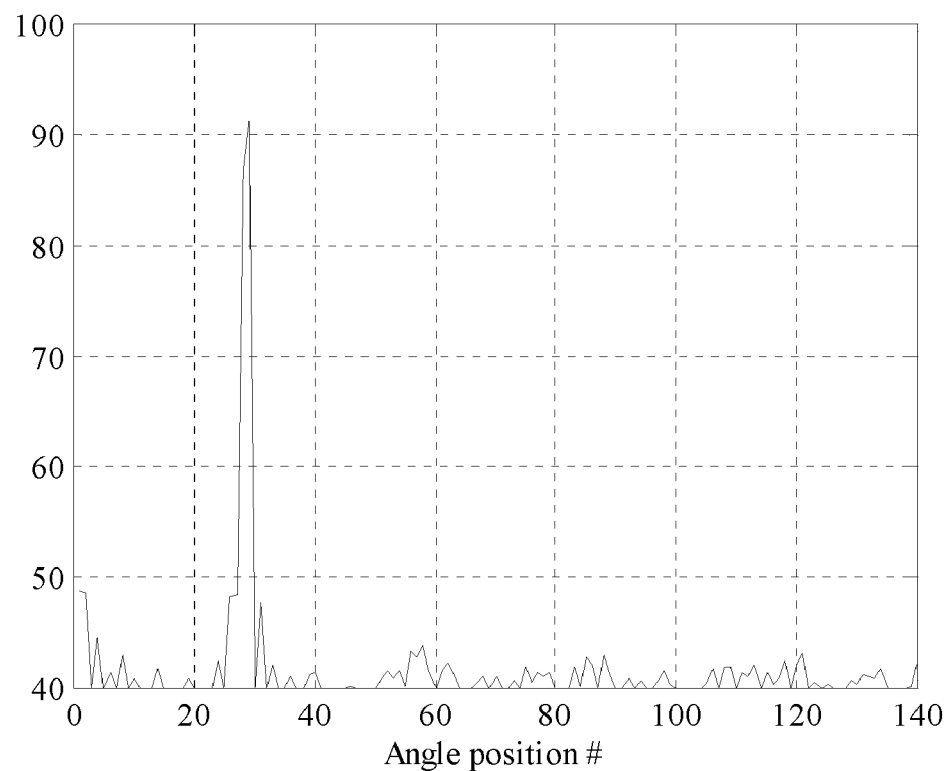
FIG. 6 shows a horizontal cut according to FIG. 2 after blur reduction according to our invented method.

FIG. 6 shows range gate #69 of FIG. 5. Compare to FIG. 2. In FIG. 6, most of the power in the broad beam of FIG. 2 is lifted and added to the correct angular position of the target, angular positions 28-29.

Other characteristics of the method suggested:

The method does not presuppose that the radar is moving (no synthetic aperture is used).

The method does not use Doppler processing.

The method suggested works particularly well when the number of angular positions per beamwidth is large. The method is less suitable for small (<<10) numbers of angular positions per beamwidth.

The method gives some improvement in angular resolution, interpreted in the sense of the possibility of resolving targets very close in angle and in the same range bin. It is not claimed that this improvement is great. The improvement is rather limited and has its particular characteristics.

The method works very well when concentrating isolated (point) targets (FIGS. 5, 6).

The invention is not limited to the above given exemplifications but may be subjected to modifications within the scope of the accompanying claims.

The invention claimed is:

1. A method useful for reducing angular ambiguity in a radar detection system having a plurality of range bins, the method comprising:
   measuring a power variable S(x, y) as a function of an angle x and a distance y;
   determining, for each of a plurality of angular values x and for a given distance y, a corrected angular position as a sum of an angular position and an angle correction for each range bin of the plurality of range bins; and
   adding an amount of measured power at said angular position to an amount of measured power at the corrected angular position,
   wherein said angle correction comprises a ratio S'(x)/S(x) and wherein said S'(x) is a partial derivative in an angular direction of the measured variable S(x).

2. The method of claim 1, wherein the partial derivative is numerically estimated using measured values of S(x).

3. The method of claim 1, wherein the partial derivative is estimated using finite differences of $\Delta S/\Delta x$.

4. The method of claim 1, wherein the partial derivative is estimated using either averaged or low-pass filtered finite differences.

5. The method of claim 1, wherein measured information from the variable S(x) are only used for such values of x in which the variable S(x) exceeds a threshold value.

6. The method of claim 1, wherein the angle correction comprises a quotient q=S'(x)/(S(x)+t), wherein S'(x) is a first derivative of the measured variable S(x) and t is a positive threshold.

7. The method of claim 1, wherein said measured variable S(x) only assumes discrete values and is represented by a variable S(i, j) with i1≦i2 and j1≦j ≦j2.

* * * * *